United States Patent Office 3,526,302
Patented Sept. 1, 1970

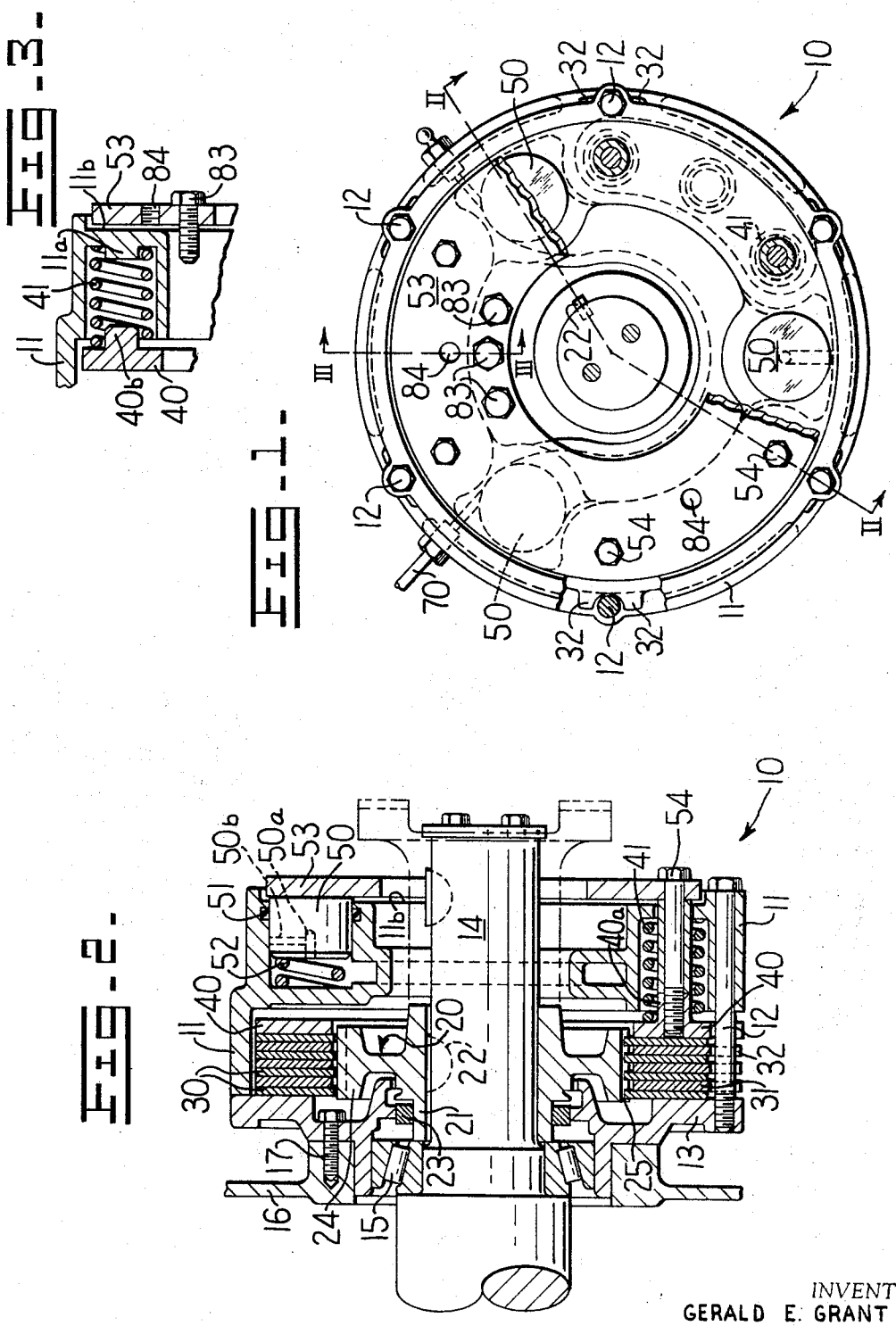

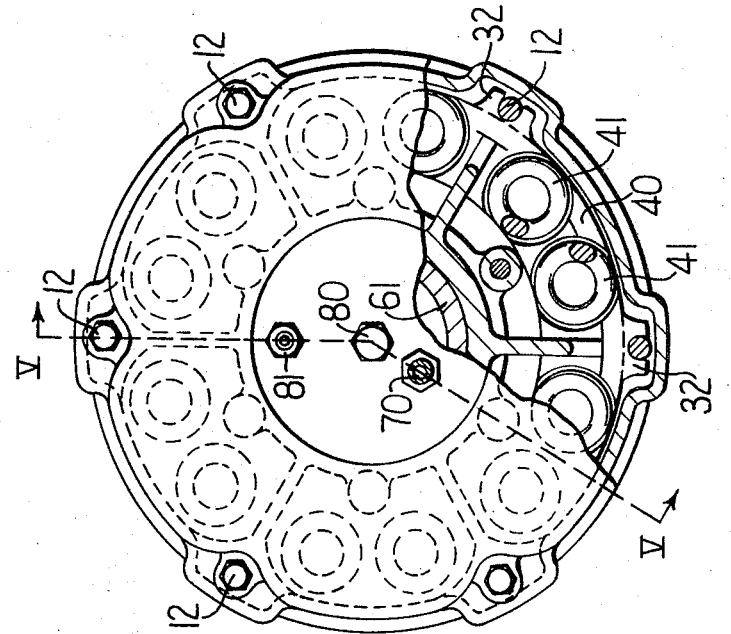
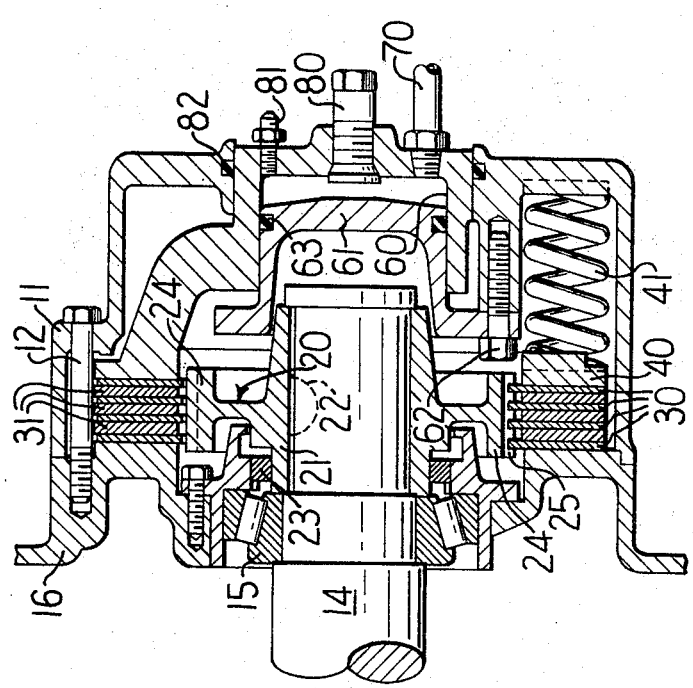

3,526,302
DRIVE TRAIN BRAKE
Gerald E. Grant, East Peoria, and Eugene M. Poplawski and George E. Schubert, Aurora, Ill., assignors to Caterpillar Tractor Co., Peoria, Ill., a corporation of California
Continuation of application Ser. No. 654,544, July 19, 1967. This application July 24, 1969, Ser. No. 847,800
Int. Cl. F16d 65/24
U.S. Cl. 188—170                      1 Claim

ABSTRACT OF THE DISCLOSURE

An auxiliary and safety brake mechanism which has a housing with an internal rotatable shaft connected to be driven by a vehicle drive train, includes a plurality of friction faced discs non-rotatably mounted on the shaft, a plurality of contact plates interspaced between the friction discs and non-rotatably secured to the housing, biasing elements urging the discs and plates into engagement with one another and fluid release servo means for overcoming the biasing elements so the mechanism may function as an auxiliary brake and an automatically actuated parking brake.

---

This application is a continuation of application Ser. No. 654,544, filed July 19, 1967, now abandoned.

BACKGROUND OF THE INVENTION

Various kinds of safety brake control have been employed with vehicles in the past and, in many of these braking systems, an emergency or safety unit is often employed to set conventional brakes independently of the normal actuating system. For example, see U.S. Pat. No. 2,809,723, issued to Howze. In most of these cases, the same braking elements are employed for both the normal braking system and the emergency brake by merely using separate linkages or actuators. Thus, in the event of failure of the brake elements, neither the normal braking system nor the emergency braking system will function. Further, in such systems the vehicle is not supplied with any kind auxiliary braking system. Obviously, when brake element failure occurs, it presents a real hazard to both personnel and machinery, since failure is most likely to occur in the brake elements when they are being used heavily.

In some vehicles auxiliary or secondary braikng mechanism have been incorporated but have been primarily parking brakes and of limited braking capacity. Further, these secondary brakes were not easily employed in conjunction with the conventional brakes, when heavy braking is required. In addition, many such systems are not failsafe, that is, automatically set when lines or linkages are broken, nor are they automatically set when the vehicle is shut down.

Therefore, the instant invention proffers a compact vehicle drive train brake mechanism which has sufficient braking capacity to stop the vehicle in emergency situations, which can be employed in conjunction with the conventional brakes of a vehicle as an auxiliary brake and which is automatically applied when the vehicle is shut down, thus functioning as a positive acting parking brake. In addition, the brake mechanism is of a fail-safe variety and thus provides greater safety.

An important consideration in the instant invention especially when it is employed as an auxiliary brake is that of cooling. Normally, considerable heat is generated in braking friction elements and through the design of the instant brake mechanism, part of the heat problem is eliminated by locating the fluid release servos remotely from the discs and plates so the heat has less effect on seals and fluid operated servo structures.

SUMMARY OF THE INVENTION

An auxiliary and safety brake mechanism for incorporation into the drive train of a vehicle and operating independent of the normal braking system includes a housing, an inner shaft rotatably connected to the vehicle drive train and being positively rotated when the drive train is rotating, a plurality of friction faced discs non-rotatably coupled to said shaft, a plurality of contact plates interspaced between said discs and non-rotatably coupled to said housing, biasing means urging said discs and plates together and fluid actuated servo means for overcoming said biasing means, said fluid actuated servo means located remotely from said discs and plates to reduce the effect of heat thereon.

BRIEF DESCRIPTION OF THE DRAWINGS

The invention will be better understood by referring to the following drawings, wherein:

FIG. 1 is an end elevation partly broken away, to show the internal detail of the brake mechanism;

FIG. 2 is a sectional view taken along line II—II of FIG. 1;

FIG. 3 is a fragmentary section taken along line III—III of FIG. 1;

FIG. 4 is an end elevation illustrating a modified embodiment of the invention; and FIG. 5 is a sectional view of the embodiment shown in FIG. 4, taken along line V—V of FIG. 4.

DESCRIPTION OF THE PREFERRED EMBODIMENT

FIG. 1 shows the novel brake mechanism 10 according to the instant invention. Its elements are enclosed in a generally cylindrical housing 11 which is secured by bolts 12 to an end plate 13. This end plate is typically mounted on the transmission case of a vehicle so that the projecting shaft 14 journaled on bearing 15 therein can be directly driven by the vehicle drive train. The shaft is geared or otherwise appropriately connected to the gear train so that it will always rotate when the gear train is rotating. The connection of the end plate to a broken away section of a transmission case 16 with bolts 17 is best seen in FIG. 2 and in FIG. 5 a portion of the transmission case actually co-operatively forms part of the end plate, as can be seen in that drawing.

The end of the shaft projecting into housing is provided with a circular drum 20 whose hub 21 is non-rotatably connected to the shaft with keys 22, or alternatively with a spline connection. The end of the hub adjacent to the end plate 16 is provided with a milled surface for receiving seal 23 which prevents the grime generated from braking from entering bearing 15 and loss of lube fluid from the transmission, if the housing is mounted thereon. The drum has a wide flat peripheral rim 24 connected thereto through a web. A plurality of grooves are milled axially on the exterior surface on this rim face to provide a plurality of teeth 25 for non-rotatably securing friction faced discs thereon.

Prior to assembly of the housing on the end plate, a plurality of friction faced discs 30, whose internal peripheries are notched to register with the teeth 25 of the drum are slid axially thereon. Interspaced between each friction faced disc is a contact plate 31 of approximately the same size but with larger internal diameters so that as they slide over the drum without contacting it. The outer periphery of each contact plate includes pairs of spaced lugs 32 between which bolts 12 pass when the cylindrical housing is assembled on the end plate. From the arrangement described above, it can be appreciated that the friction discs are free to move axially on the teeth 25 of the drum and that the contact plates suspended between the friction discs can move axially along bolts 12 but neither can rotate relative to its attached assembly.

When the sandwich formed by the discs and plates is "clamped" together, friction therebetween will be increased and the shaft will be retarded, thereby slowing or stopping the vehicle. The number of discs and plates may be increased to increase the braking capacity of the unit and therefore it is possible to add or remove discs and plates depending upon the size of the vehicle, on which the unit is being employed. Thus the same basic construction can be used in both light and heavy duty vehicles.

To accomplish the objective of this invention, the disc and plate sandwich must be "squeezed or clamped" together in order to achieve braking by some positive, fail-safe means. In the instant invention this is accomplished by use of a pressure plate 40 at one end of the disc and plate sandwich and urging the pressure plate against the sandwich with a plurality of springs 41, so it will be compressed between the pressure plate and a surface on end plate 13, or alternatively, as shown in FIG. 5 against a portion of the transmission case. The springs are circumferentially disposed around the end plate and are oriented generally axially, as can be seen in FIGS. 2 and 5. In the embodiment shown in FIG. 2 the housing includes a plurality of axial bores in the housing which receive the springs and a plurality of projecting tubes 40a support each spring concentrically thereon. Some of the springs are supported by short pins 40b and 11a at the opposite ends as shown in FIG. 3.

In FIG. 5 the plurality of springs circumferentially spaced about the pressure plate are contained between recesses protruding a portion of the pressure plate and the inner peripheral walls of the housing. Thus, in both embodiments, the springs urge the respective pressure plates against the sandwich of discs and contact plates so that they will be "compressed or clamped" between the pressure plate and end plate 13, or a milled surface on the transmission case, as shown in FIG. 5. This positive spring bias gives the brake a fail-safe operation since the springs will positively apply the brakes, until overcome by release means and require no other power means for braking action.

In the instant invention, since the brake is designed to be employed as an auxiliary brake in conjunction with any normal brakes of the vehicle, it is important that the fluid release servos which overcome the combined bias of the plurality of springs surrounding the pressure plate, be located remotely on the sandwich of the discs and contact plates, so the heat generated thereby does not adversely affect the servos. To accomplish this objective the two constructions shown in FIGS. 2 and 5 both effectively locate the fluid operated servos remotely of the disc and plate sandwich.

Referring to FIGS. 1 and 2, a plurality of pistons 50 which are received in axial bores, are circumferentially spaced in housing 11, as can be seen in the drawings. Each bore is provided with a circular sealing groove in which a seal 51 is inserted prior to the insertion of the piston. Also a small spring 52 is inserted ahead of the piston so that it will act on the underside of the piston holding it in an outboard position. Once the pistons have been inserted and cover plate 53 is assembled on the end of the housing and is secured to the pressure plate 40 through bolts 54 tapped into tubes 40a, which are part of pressure plate 40, and the chambers beneath the pistons are pressurized, the cover plate will be forced axially outward, pulling the pressure plate 40 with it and overcoming the bias of the springs.

In FIG. 5 the alternative embodiment of the invention employs a single fluid release servo coaxially located in the housing. In this embodiment a coaxial bore 60 in the protruding portion of the pressure plate receives a plug 61 which is fastened to the housing 11 by bolts 62. The plug is so sized that the bore formed in the pressure plate can reciprocate relative to the plug and a sealing groove is provided with seal 63 to prevent fluid loss from the chamber formed thereby. When this chamber is pressurized, the pressure plate will be forced axially outwardly relative to the plug and thereby compress the springs.

In both the embodiments, a hydraulic line 70 from an engine driven pump is used to pressurize the fluid release servos when the engine is operating, if the operator has not actuated the auxiliary brake system. The auxiliary brake operating system (not shown) includes a valve means actuated by the operator which interrupts and bleeds the pressurized fluid from the fluid release servos in the two embodiments shown, so the spring pressure will apply the brakes. Of course, when the engine is shut down, fluid pressure is lost and the springs will apply the brakes automatically, actuating the unit as a parking brake. Alternatively, when used as a auxiliary the amount of fluid bled from the fluid release servos will determine the amount of braking by unit.

In FIG. 5 a manual maintenance release bolt 80 is shown which can be turned into the end of the housing against the end of plug 61 and lift the pressure plate free of its biased engagement on the disc and plate sandwich without fluid pressure. Also this chamber is provided with a bleed nut 81 by which trapped air may be released from the system to prevent fluctuation. In addition this embodiment employs a seal 82 between the pressure plate and the housing to prevent the ingressed water and foreign material into the assembly.

When disassembling the brake mechanism shown in FIG. 5 the bleed nut 81 should be removed since some hydraulic systems include accumulators which may partially pressurize the system after shutdown but not sufficiently to cause the release servos to overcome the force of the springs. Obviously this residual pressure will be released when the unit is disassembled posing a hazard to maintenance personnel and this is the reason for removing the bleed nut.

In the embodiment shown in FIG. 2 each piston 50 includes a blind bore 50a in its pressure face intersected by a central radial passage 50b which open on its cylindrical surface. These passages constitute a safety bleed which vents any residual hydraulic pressure prior to the time the pistons completely leave their associated bores as their respective openings in their cylindrical surfaces move out of association with the walls of their bore. Utilizing this arrangement, injury to maintenance personnel can be avoided. Obviously, a similar bleed passage could be employed in the embodiment shown in FIG. 5 to insure personnel safety should they fail to remove the bleed nut.

The embodiment shown in FIG. 1 also has a manual release system which employs three bolts 83 which are shown in a stowed position therein. When manual release is desired these bolts are removed from their stowed positions, inserted in threaded holes 84. As the bolts are screwed into their respective bores, they abut upon an interior wall 11b of the housing (see FIG. 2) and drive the cover plate 53 axially outward releasing the brake in the same manner as the fluid servos when the latter are pressurized.

What is claimed is:
1. In combination with a vehicle having a transmission, a driven shaft in its drive train, a self-actuating, auxiliary and parking brake comprising:
    a circular end plate having a central aperture and mounted to said transmission on said vehicle so said driven shaft projects through its aperture and is journaled therein on a circular bearing;

a drum keyed to said shaft by a spline connection, said drum having a wide flat peripheral rim, a plurality of grooves in the exterior surface of said rim, the portions of said surface between said grooves forming teeth;

sealing means between said drum and end plate to prevent particles from entering the area adjacent said bearing;

a hollow cylindrical housing mounted to said end plate by a series of bolt means, said housing enclosing said drum and internally spaced therefrom;

a plurality of friction faced plate elements having spaced lugs on the outer periphery thereof non-rotatably mounted to said housing with said bolt means passing between said spaced lugs and a plurality of friction-faced disc elements interspaced with said plate elements and having their internal peripheries notched and registering with said teeth on the surface of said rim;

a circular pressure plate reciprocably mounted within said housing adjacent to said plurality of friction disc and plate elements and in the portion opposite to that portion attached to said pressure plate;

said pressure plate having a plurality of cut away areas;

said housing having a first plurality of circumferentially spaced inwardly opening bores adjacent said pressure plate;

a plurality of springs located in said bores in said housing and abutting said pressure plate operable to urge said pressure plate toward said end plate whereby said plurality of friction discs and plates will be compressed together;

a second plurality of circumferentially spaced bores in said housing, said bores opening outwardly;

a circular cover plate mounted in the end of said housing opposite said end plate, said cover plate having an aperture through which said shaft extends;

means passing through said spring means and connecting said cover plate to said pressure plate;

hydraulic means located within said second plurality of circumferentially spaced bores and attached to said cover plate and operable upon pressurization to withdraw said pressure plate through its connection with said cover plate from said plurality of friction disc and plate elements by overcoming the force of said springs to release the auxiliary and parking brake;

said hydraulic means comprising a plurality of pistons located in said spaced bores in said housing, said pistons being normally biased against said cover plate; and mechanical release means for overcoming the force of the spring for disabling said brake.

References Cited

UNITED STATES PATENTS

| | | |
|---|---|---|
| 2,342,750 | 2/1944 | Newell. |
| 2,584,191 | 2/1952 | Danly et al. |
| 2,698,676 | 1/1955 | Eason. |
| 2,778,456 | 1/1957 | Ross. |
| 3,132,724 | 5/1967 | Ansteth. |
| 3,195,692 | 7/1965 | Herr et al. |

DUANE A. REGER, Primary Examiner

U.S. Cl. X.R.

188—106